Patented June 19, 1934

1,963,383

UNITED STATES PATENT OFFICE

1,963,383

PROCESS OF SULPHONATING ANTHRAQUINONE AND ITS DERIVATIVES

Donald G. Rogers, Hamburg, N. Y., assignor to National Aniline and Chemical Company, Inc., New York, N. Y., a corporation of New York No Drawing. Application March 20, 1930, Serial No. 437,590

31 Claims. (Cl. 260—57)

This invention relates to the manufacture and production of sulphonic acids of anthraquinone and its derivatives, and more particularly to improvements in the processes of sulphonating anthraquinone and its derivatives.

It has heretofore been proposed to sulphonate anthraquinone and its derivatives by heating them with oleum, with or without the addition of an orientation catalyst, such as a mercury compound. The products obtained, and particularly the polysulphonic acid derivatives, are generally impure, due to oversulphonation and the formation of oxidation products, which are caused by the action of the oleum on the compounds treated at the high temperatures employed.

An object of the present invention is to provide a process whereby anthraquinone compounds, particularly anthraquinone and its hydroxyderivatives, can be sulphonated under less drastic conditions than those formerly employed.

Another object of the invention is to provide improvements in processes of producing anthraquinone sulphonic acids by heating anthraquinone and certain of its derivatives with oleum, whereby each of the three major reaction-controlling factors—time, temperature and concentration of oleum—can be decreased without concurrently increasing one or both of said other two factors.

Another object of the invention is to provide a sulphonation process whereby an anthraquinone sulphonic acid can be obtained in a higher yield and of a higher grade of purity than could be obtained in accordance with previously known sulphonation processes.

A further object of the invention is to provide improvements in processes of producing anthraquinone sulphonic acids, and particularly the polysulphonic acids, by heating anthraquinone compounds with oleum whereby the oversulphonation and oxidation which occur in said processes can be mitigated or obviated.

An additional object of the invention is to provide improvements in the isolation of anthraquinone sulphonic acids, and particularly hydroxyanthraquinone sulphonic acids, from their solutions in sulphuric acid whereby increased yields of the sulphonic acids are obtained.

Other objects will in part be obvious and will in part appear hereinafter.

The invention accordingly comprises the several steps and the relation of one or more of such steps with respect to each of the others thereof which will be exemplified in the process hereinafter disclosed. The scope of the invention will be indicated in the claims.

According to the present invention, an anthraquinone compound may be sulphonated by heating it with a mixture containing oleum and a sulphate of an alkali-forming metal, and the resulting sulphonic acid may be recovered in any suitable manner.

I have found, in the sulphonation of an anthraquinone compound, that, in general, the presence in the reaction mixture of a sulphate of an alkali-forming metal (which expression is intended to include the sulphates of magnesium and ammonium as well as those of the alkali-metals and the alkaline earth metals), and especially a sulphate of an alkali-metal, has a modifying effect on the sulphonation reaction. Thus, it enables the sulphonation reaction to be more readily controlled; permits any of the three major reaction-controlling factors of the sulphonation—time, temperature, and concentration of oleum—to be decreased without concurrently increasing one or both of the other of said factors; decreases oversulphonation, decomposition and oxidation; and increases the yield and improves the quality of the products obtained.

I have furthermore found that the sulphonation generally proceeds more regularly and uniformly, and the advantages resulting from the presence of the sulphate of an alkali-forming metal in the reaction mixture are more completely realized, if the sulphonic acid produced is caused to separate out of solution during the sulphonation, whereby the sulphonic acid is removed from the sphere of reaction. This separation occurs spontaneously in many cases wherein a sufficient amount of the sulphate of the alkali-forming metal is present; it preferably may be caused to take place, however, and at an earlier stage in the sulphonation, by the addition to the sulphonation mixture of crystals of the sulphonic acid to be produced, or a salt thereof.

I have also found that the sulphonic acids produced by the sulphonation of anthraquinone and its derivatives with oleum and a sulphate of an alkali-forming metal may be recovered from the sulphonation mixture at lower cost and in higher yields by introducing the sulphonation reaction mixture into an aqueous solution of an alkali-metal compound capable of forming the alkali-metal salt of the sulphonic acid.

In carrying out the present invention in accordance with a preferred procedure, anthraquinone or an anthraquinone derivative, particularly a hydroxyanthraquinone, may be sulphonated by heating it with oleum which preferably contains a sulphate of an alkali-forming metal partially or wholly in solution in said oleum, and preferably seeding the sulphonation mixture during the sulphonation with crystals of the sulphonic acid to be produced or a salt thereof, whereby the sulphonic acid is caused to separate out of the sulphonation mixture during the reaction. The heating may be continued until the desired sulphonation has been completed, and the resulting sulphonic acid may be recovered by adding the resulting reaction mixture to an aqueous solution of an alkali-metal compound which is capable of forming an alkali-metal salt of the sulphonic acid, or in any other suitable manner.

Among the anthraquinone compounds which may be treated in accordance with the invention, there may be mentioned, by way of example, anthraquinone; alkyl-anthraquinones; aryl-anthraquinones; hydroxyanthraquinones (as for example, erythroxyanthraquinone, beta-hydroxyanthraquinone, alizarine, purpurine, anthrarufine, chrysazine, anthraflavic acid, iso-anthraflavic acid, 1.6-dihydroxyanthraquinone, 1.7-dihydroxyanthraquinone, anthrachrysone, anthrapurpurine, alizarine Bordeaux, flavopurpurine, diamino-anthrarufine, diamino-chrysazine, etc.) halogen-anthraquinones (as for example, 1-chloro-anthraquinone, 2-chloro-anthraquinone, 1-bromo-anthraquinone, 2-bromo-anthraquinone, 1.5-dichloro-anthraquinone, 1.8-dichloro-anthraquinone, etc.); and amino-anthraquinones, particularly, alkylamino-anthraquinones, arylamino-anthraquinones and arylamino-alkyl-amino-anthraquinones (as for example, mono-phenylamino-anthraquinone, di-phenylamino-anthraquinone, mono-tolylamino-anthraquinone, di-tolylamino-anthraquinone, hydroxy-phenyl-amino-anthraquinone, hydroxy-tolylamino-anthraquinone, di-arylamino-hydroxyanthraquinone, arylamino-amino-anthraquinones, arylamino-anthrapyridones, arylamino-alkyl-anthrapyridones, alizarine uranol base (C. I. 1058), alizarine geraniol B base (C. I. 1092), indanthrone, etc.). Mixtures of two or more anthraquinone compounds also may be employed. The invention is preferably directed to the sulphonation of anthraquinone compounds which are free from a primary amino group, especially, from a primary amino group as a sole substituent in the anthraquinone nucleus; and is particularly concerned with the sulphonation of an anthraquinone compound having the probable formula

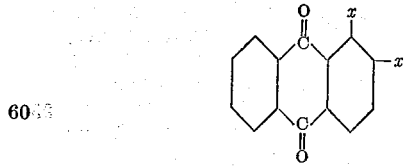

in which $x$ represents a hydrogen atom or a hydroxyl group.

The oleum employed may be of any suitable concentration and may be employed in amounts varying over wide limits, preferably in an amount at least sufficient to produce the desired sulphonic acid. An oleum of about 15 to 30 per cent. sulphur trioxide concentration is preferred in view of its commercial availability and convenience in handling.

The sulphates of the alkali-forming metals which may be employed comprise the sulphates of sodium, potassium, ammonium, calcium, barium, strontium, magnesium, etc.; and they may be employed singly or in admixtures of two or more. The sulphates which are readily soluble in the oleum employed are preferred, as the advantages resulting from the presence of a sulphate of an alkali-forming metal in the reaction mixture are generally more completely realized when the sulphate is in solution. The alkali-forming metal sulphate preferably may be employed in an amount somewhat in excess of that corresponding to the amount of normal sodium sulphate required to form the monosodium salt of the sulphonic acid produced; and it may be added to the oleum and partially or wholly dissolved therein, or it may be generated in the oleum by reaction thereof with a suitable alkali-forming metal compound. The following will serve as preferred illustrations of suitable sulphates and other compounds: the normal sulphates, acid sulphates, polysulphates, pyrosulphates, carbonates, chlorides, borates, phosphates, etc., of sodium, potassium and ammonium.

The anthaquinone compound may be added to the oleum before, together with, or after the alkali forming metal sulphates; it preferably may be added to a mixture of the alkali-forming metal sulphate and the oleum.

The temperature at which the sulphonation may be carried out and the duration of the period of heating also will vary within wide limits. Low temperatures are preferred to high temperatures, because they tend to produce less oversulphonation, decomposition and oxidation.

The heating preferably may be continued until the desired sulphonation has been effected. This is generally determined by testing portions of the reaction mixture until it shows substantial freedom from the original anthraquinone compound treated. The duration of the period of heating, the particular amount and strength of oleum used, and the temperature employed will depend, to a considerable extent, upon the other factors controlling the reaction; such as, the amount and strength of oleum, temperature, duration of heating, and the particular alkali-metal sulphate employed. These factors, will in turn depend, to a considerable extent, upon the sulphonic acid to be produced and upon the particular anthraquinone compound treated; inasmuch as some anthraquinone compounds are more readily sulphonated than are others, as is well known to the art. It will be noted, however, that, in general, the presence in the sulphonation reaction mixture of a sulphate of an alkali-forming metal, and particularly a sulphate of an alkali-metal, increases the rate of the sulphonation reaction, particularly at the higher temperatures; so that, in sulphonating any anthraquinone compound, a lower temperature, or a weaker oleum, or a shorter reaction period generally may be employed than heretofore was known to be possible under similar reaction conditions.

To illustrate, I have found that anthraquinone (99 per cent. pure) can be disulphonated by heating it for about 25 minutes at 150° to 155° C. with 3.5 parts of 26 per cent. oleum in which 0.02 parts of mercurous sulphate and 0.35 parts of anhydrous sodium sulphate have been dissolved (all parts being by weight per part of anthraquinone); whereas the same reaction mixture, with the omission of the sodium sulphate, heated at the same temperature requires about 50 minutes to complete the reaction. In addition, the reaction mixture which contains the sodium sulphate produces the higher yield of anthraquinone disulphonic acids, accompanied by a lesser amount of impurities. The reaction also may be carried out at a lower temperature (e. g., 120° to 125° C.) in which case a still greater increase in the yield and purity are obtained; the time required is only about 5.5 hours as compared with the reaction period of about 15 hours formerly employed under similar reaction conditions but in the absence of an alkali-metal sulphate.

The sulphonic acids may or may not be caused to separate out of solution in the reaction mixture during the sulphonation, as for example, by seeding. Seeding is preferably employed, however, in order to cause the separation to occur in those cases wherein it does not spontaneously occur, and to cause it to take place sooner in other cases. The reaction mixture may be seeded, for example, with crystals of the sulphonic acid to be produced or with an alkali-metal salt thereof.

The sulphonation may be carried out in the absence of, or in conjunction with, orientation or other catalysts, such as mercury sulphate, vanadic acid, boric acid, etc. I have found that the presence in the sulphonation mixture of a sulphate of an alkali-forming metal has little, if any, harmful effect upon the action of such orientation or other catalysts.

The sulphonic acid may be recovered from the sulphonation mixture by diluting the sulphonation mixture, as for example, by adding it to water, and salting out the sulphonic acid, in the form of an alkali-metal salt, with a suitable alkali-metal compound capable of forming an alkali-metal salt of the sulphonic acid (for example, sodium chloride, potassium chloride, sodium sulphate, potassium sulphate, etc.); by adding the sulphonation mixture to an aqueous solution of an alkali-metal compound capable of forming an alkali-metal salt of the sulphonic acid (for example, sodium or potassium sulphate or chloride, etc.), filtering off the insoluble alkali-metal salt of the sulphonic acid, and washing it with an aqueous solution of an alkali-metal salt, such as sodium or potassium chloride or sulphate, etc.; by separating the crystallized product from the remainder of the reaction mixture (e. g., by filtration) and, if desired, recovering the residual sulphonic acid from the filtrate (e. g., in either manner described above for isolation of the sulphonic acid); or in any other suitable manner. The isolation of the product by drowning the sulphonation reaction mixture in an aqueous solution of an alkali-metal compound, filtering off the alkali-metal salt of the sulphonic acid, and washing with an aqueous solution of an alkali-metal compound is preferred as it leads to a greater yield. The wash liquor is preferably employed as the diluting liquid in the drowning of a subsequent sulphonation mixture produced in a repetition of the process.

The extent to which the reaction mixture is diluted, that is, the relative amount of solution in which the reaction mixture is drowned, will depend upon several factors, such as the amount of liquid to be handled, the corrosive effect of the acid solution on the filtering equipment employed, etc. Dilution to an acidity corresponding to a sulphuric acid content of about 10 to 20 per cent. is ordinarily preferred for operation in standard factory equipment.

The invention is not limited to the isolation of an anthraquinone sulphonic acid from a reaction mixture in which it was prepared by means of oleum containing a sulphate of an alkali-forming metal, but includes the separation of an anthraquinone sulphonic acid from a mixture thereof with sulphuric acid containing a sulphate of an alkali-forming metal, preferably an alkali-metal sulphate, produced in any suitable manner. It particularly relates to the isolation of an anthraquinone sulphonic acid which, when added to an aqueous solution of sodium chloride, forms soft, sticky tar-like aggregates which tend to coalesce and form large lumps from which impurities can be removed only with difficulty; as for example, alizarine sulphonic acid. Thus, the invention includes the addition of an alkali-metal sulphate (e. g., sodium or potassium sulphate) to a sulphonation reaction mixture resulting from the sulphonation with oleum of an anthraquinone compound (as for example, alizarine) in the absence of a sulphate of an alkali-forming metal, and addition of the resulting mixture to an aqueous solution of sodium chloride. The presence of the alkali-metal sulphate in the mixture before dilution with the aqueous solution of the alkali-metal compound results in the formation of a readily filterable precipitate when the mixture is diluted.

As illustrative embodiments of a manner in which the invention may be practiced, the following examples are presented. The parts are by weight.

*Example 1.*—2 parts of mercurous sulphate and 35 parts of anhydrous sodium sulphate are mixed with 350 parts of 26 per cent. oleum contained in a suitable vessel equipped with an agitator and heating and cooling means, and the mixture is stirred until the sodium sulphate is substantially completely dissolved. 100 parts of anthraquinone (99 per cent.) is then added with stirring, the mixture is heated at 120° to 125° C. for about 1 to 2 hours, crystals of a mixture of the sodium salts of 1.5- and 1.8-anthraquinone-disulphonic acid, saved from the product of a previous operation, are added as a seed, and heating is continued at said temperature until a test portion is substantially completely soluble in water. During the heating operation the product crystallizes out of solution. When the sulphonation is complete, the mixture is cooled to 25° C. and added to 1450 parts of an aqueous solution of common salt (NaCl) having a density of 22° Bé. while maintaining the temperature at or below 25° C. The mixture is allowed to stand at said temperature with occasional agitation to complete the precipitation of the product, and the precipitate is filtered off and washed acid free with salt solution. The product is a mixture of the sodium salts of 1.5- and 1.8-anthraquinone-disulphonic acids of a high degree of purity and in a high yield.

*Example 2.*—20 parts of anhydrous sodium sulphate is added to a mixture of about 200 parts of 26 per cent. oleum and about 37 parts of 100 per cent. sulphuric acid (equivalent to about 237 parts of 22 per cent. oleum) contained in a suitable vessel equipped with an agitator and heating and cooling means, and the mixture is stirred until the sodium sulphate is substantially completely dissolved. The mixture is cooled to about 30° C. to prevent an undue temperature rise during the subsequent addition of anthrarufine, and about 60 parts of technical anthrarufine (containing about 58.9 parts of a mixture of anthrarufine and chrysazine) is added with stirring. The reaction mixture is agitated until substantially all of the anthrarufine has dissolved, is then heated to about 80° C., is maintained at a temperature of about 80° to 85° C. for a few minutes, then crystals of technical anthrarufine sodium sulphonate are added as a seed, and heating is continued at 80° to 85° C. until the sulphonation is complete, as indicated by complete solution of a sample in water. During the sulphonation, the disulphonic acids produced crystallize out of solution. The sulphonation mixture is drowned in about 2400 parts of cold water, sufficient salt (NaCl) is added completely to precipitate the product, which is filtered off, washed acid free with salt water, and recovered in the paste form. The resulting product comprises a mixture of a major proportion of anthrarufine disulphonic acid and a minor proportion of chrysazine disulphonic acid in the form of their sodium salts.

*Example 3.*—16 parts of anhydrous sodium sulphate is dissolved with stirring in a mixture of 102.5 parts of 25.9 per cent. oleum and 47.5 parts of 100 per cent. suphuric acid (equivalent to 150 parts of 17.7 per cent. oleum) contained in a suitable vessel equipped with an agitator and heating and cooling means. 50 parts of dry alizarine (1.2-dihydroxyanthraquinone) in the form of lumps (99 per cent. pure) is added while maintaining the temperature below 40° C., and the mixture is stirred while still maintaining the temperature below 40° C. until substantially all of the alizarine is in solution. The solution is slowly heated to 90° C., maintained at 90° to 100° C. for 10 to 30 minutes, crystals of sodium alizarine sulphonate are then added, as a seed, and the heating is continued until a test portion is substantially completely soluble in water. If necessary, small additions of oleum may be made to complete the sulphonation. When the sulphonation is complete, the mixture containing the alizarine sulphonic acid, which has largely separated out of solution, is cooled to about 25° C. and drowned in about 1400 parts of aqueous sodium chloride solution (20° Bé. to 21° Bé.) while maintaining the temperature below 30° C. The mixture is allowed to stand with cooling and occasional agitation to complete the separation of the product, and the product is filtered off, washed with salt solution and dried. It consists of the sodium salt of alizarine-3-sulphonic acid (1.2-dihydroxy-anthraquinone-3-sulphonic acid).

It will be realized that the invention is not limited to the specific examples given above, and that the process may be varied within wide limits without departing from the spirit and scope of the claims.

Thus, the reaction conditions may be varied within wide limits, as has been hereinbefore pointed out.

For example, the above sulphonations may be carried out with or without a mercury compound as a catalyst, or in the presence of other catalysts, depending upon the product desired. The amount of oleum employed may be varied depending upon the other factors controlling the reaction; an amount of oleum corresponding to an excess of about 0.4 to 0.6 mols of sulphur trioxide over the amount theoretically required to produce the desired sulphonic acid per mol of anthraquinone compound treated being preferred. If the anthraquinone compound contains an undue amount of moisture or of impurities, additional oleum may be added, as required, to complete the sulphonation; and when the metal sulphate is generated in the reaction mixture by reaction with the oleum, proper allowance should be made for the sulphuric acid removed thereby.

The strength of the oleum employed also may vary within wide limits; for example, an oleum of about 20 to 50 per cent., preferably 22 to 30 per cent., of sulphur trioxide may be employed in the sulphonation of anthraquinone; an oleum of about 15 to 30 per cent., preferably 18 to 22 per cent., of sulphur trioxide may be employed in the sulphonation of anthrarufine and similar alpha-alpha-dihydroxyanthraquinone compounds; and an oleum of about 10 to 20 per cent., preferably 16 to 18 per cent., of sulphur trioxide may be employed in the sulphonation of alizarine and similar 1.2-dihydroxyanthraquinone compounds. The use of the weaker grades of oleum requires a correspondingly larger amount of oleum and a higher temperature or longer reaction period, or both, to effect the same degree of sulphonation than does the employment of oleum of the preferred strength; and the use of the stronger grades of oleum increases the danger of local oversulphonation, and requires a correspondingly smaller amount of oleum, which unduly thickens the mass and renders it more difficult to agitate.

The temperature at which the sulphonation may be carried out may vary within wide limits; for example, the sulphonation of anthraquinone may be carried out at temperatures between about 110° and 160° C., a temperature of about 120° to 130° C. being preferred; the sulphonation of anthrarufine may be conducted at temperatures between about 70° and 115° C., preferably at a temperature of about 80° to 85° C.; and the sulphonation of alizarine may be performed at temperatures between about 80° and 130° C., preferably at a temperature of about 90° to 100° C.

The amount of metal sulphate may be varied; a preferred minimum amount is that equivalent to about 0.5 to 0.6 mols of normal sodium sulphate per mol of anthraquinone compound treated. A lesser amount tends to decrease the benefits derived from its presence.

The sulphonic acids produced according to the above examples also may be isolated in any other desired manner, as for example, by one of the other methods of procedure hereinbefore referred to.

The sulphonation of a dihydroxyanthraquinone compound, such as anthrarufine and alizarine, also may be carried out without a sulphate of an alkali-forming metal in the sulphonation mixture, but with seeding to cause crystallization of the sulphonic acid produced at an early stage in the sulphonation; the inclusion in the process of both the presence of a sulphate of an alkali-forming metal (and especially, of an alkali-metal sulphate) and seeding is preferred, however.

The invention, furthermore, is not limited to the sulphonation of the particular anthraquinone compounds illustrated in the above specific examples, but may be employed in the sulphonation of other hydroxyanthraquinone compounds, more particularly polyhydroxyanthraquinone compounds which contain a hydroxyl group in the 1- and 2-positions of the anthraquinone nucleus, and of other anthraquinone compounds; as for example, the alkyl-anthraquinones, aryl-anthraquinones, halogen-anthraquinones, amino-anthraquinones, etc.

The following example further illustrates the application of the invention to the sulphonation of an arylaminoanthraquinone color base for the production of an anthraquinone dyestuff.

*Example 4.*—6.5 parts of sodium sulphate (anhydrous) is added to a mixture of 32 parts of 25 per cent. oleum and 68 parts of 100 per cent. sulphuric acid (equivalent to about 100 parts of 8 per cent. oleum) contained in a suitable vessel equipped with an agitator and heating and cooling means, and the mixture is stirred until the sodium sulphate is substantially completely dissolved. The mixture is cooled, 20 parts of 1.4-di-paratolylaminoanthraquinone (quinizarine green) is added with agitation while maintaining the temperature below 20° C., and the resulting mixture is heated at 50° to 55° C. until a test portion is substantially completely soluble in water. The reaction mixture is then added to 1000 parts of 20 per cent. aqueous sodium chloride solution at a temperature below 20° C., the mixture is allowed to stand at said temperature with occasional stirring to complete the separation of the product, and the product is filtered off, washed with salt solution and dried. The product, which is the sodium salt of 1.4-diparatolyl-amino-anthraquinone sulphonic acid (alizarine cyanide green), is obtained in a substantially theoretical yield.

The sulphonation may also be carried out at temperatures between about 10° and 80° C., but temperatures of about 40° to 60° C. are preferred. The amount and concentration of oleum may vary within wide limits; an amount of sulphur trioxide preferably may be employed which is in slight excess of that theoretically required to produce the desired sulphonic acid. The product also may be separated in any other suitable manner, as for example, by drowning the reaction mixture in water, salting out (e. g., with sodium chloride) filtering off the precipitate, washing and drying.

Since, in carrying out the above process, changes may be made without departing from the scope of the invention, it is intended that all matter contained in the above description shall be interpreted as illustrative and not in a limiting sense, except as limited by the claims.

I claim:

1. In the production of anthraquinone derivatives by a process which comprises sulphonating an anthroquinone compound, the improvement which comprises carrying out the sulphonation in the presence of a sulphate of an alkali-forming metal as a sulphonation modifier.

2. A process for the production of anthraquinone derivatives which comprises reaction an anthraquinone compound with a sulphonating mixture containing oleum and a sulphate of an alkali-forming metal as a sulphonation modifier, whereby an anthraquinone sulphonic acid compound is produced.

3. A process for the production of anthraquinone derivatives which comprises heating an anthraquinone compound with oleum, whereby the anthraquinone compound is sulphonated and an anthraquinone sulphonic acid is produced, and removing the anthraquinone sulphonic acid from the sphere of reaction by causing it to separate out of solution in the reaction mixture while continuing the sulphonation of the anthraquinone compound.

4. A process for the production of anthraquinone derivatives which comprises heating an anthraquinone compound with a sulphonating mixture containing oleum and a sulphate of an alkali-forming metal as a sulphonation modifier, whereby the anthraquinone compound is sulphonated and an anthraquinone sulphonic acid is produced, and removing the anthraquinone sulphonic acid from the sphere of reaction by causing it to separate out of solution in the reaction mixture while continuing the sulphonation of the anthraquinone compound.

5. A process for the production of anthraquinone derivatives which comprises heating an anthraquinone compound with a sulphonating mixture containing oleum and the sulphate of an alkali metal as a sulphonation modifier, whereby the anthraquinone compound is sulphonated and an anthraquinone sulphonic acid is produced, removing the anthraquinone sulphonic acid from the sphere of reaction by causing it to separate out of solution in the reaction mixture in the form of an alkali metal salt, and continuing the sulphonation of the antraquinone compound in the presence of the resulting separated anthraquinone sulphonic acid.

6. A process for the production of anthraquinone derivatives which comprises heating an anthraquinone compound with a sulphonating mixture containing oleum and a sulphate of an alkali-forming metal, whereby an anthraquinone sulphonic acid compound is produced, and adding the resulting reaction mixture to an aqueous solution of an alkali-metal compound capable of forming an alkali-metal salt of the sulphonic acid.

7. A process for the production of anthraquinone derivatives which comprises heating an anthraquinone compound which is free from a primary amino group as a sole substituent in the anthraquinone nucleus with a sulphonating mixture containing oleum and a sulphate of an alkali-forming metal as a sulphonation modifier, whereby an anthraquinone sulphonic acid compound is produced.

8. A process for the production of anthraquinone derivatives, which comprises heating an anthraquinone compound with a sulphonating mixture containing oleum whereby an anthraquinone sulphonic acid compound is produced, and sodium sulphate, and, during the sulphonation, causing the sulphonic acid compound produced to separate out of solution in the form of a sodium salt, by adding to the reaction mixture crystals comprising said sulphonic acid as a seed.

9. A process for the production of anthraquinone derivatives which comprises heating a di-arylamino-anthraquinone compound with a sulphonating mixture containing oleum and a sulphate of an alkali metal as a sulphonation modifier, whereby an arylamino-anthraquinone sulphonic acid is produced.

10. A process for the production of anthraquinone derivatives which comprises heating a hydroxyanthraquinone compound with a sulphonating mixture containing oleum and a sulphate of an alkali metal as a sulphonation modifier, whereby a hydroxyanthraquinone sulphonic acid is produced.

11. A process for the production of anthraquinone derivatives which comprises heating a hydroxyanthraquinone compound with oleum, whereby the hydroxyanthraquinone compound is sulphonated and a hydroxyanthraquinone sulphonic acid is produced, removing the hydroxyanthraquinone sulphonic acid from the sphere of reaction by causing it to separate out of solution in the reaction mixture, and continuing the sulphonation of the hydroxyanthraquinone compound in the presence of the resulting separated hydroxyanthraquinone sulphonic acid.

12. A process for the production of anthraquinone derivatives which comprises heating a polyhydroxyanthraquinone compound with a sulphonating mixture containing oleum and the sulphate of an alkali metal as a sulphonation modifier, whereby the polyhydroxyanthraquinone compound is sulphonated and a polyhydroxyanthraquinone sulphonic acid is produced, removing the polyhydroxyanthraquinone sulphonic acid from the sphere of reaction by causing it to separate out of solution in the reaction mixture in the form of an alkali metal salt, and continuing the sulphonation of the polyhydroxyanthraquinone compound in the presence of the resulting separated polyhydroxyanthraquinone sulphonic acid.

13. A process for the production of anthraquinone derivatives which comprises heating a polyhydroxyanthraquinone compound with a sulphonating mixture containing oleum and an alkali metal sulphate, whereby a polyhydroxyanthraquinone sulphonic acid is produced, and seeding the reaction mixture during the course of the sulphonation with crystals comprising said sulphonic acid to cause separation of said resulting sulphonic acid in the form of an alkali metal salt.

14. A process for the production of anthraquinone derivatives which comprises heating a dihydroxyanthraquinone with a sulphonating mixture containing oleum and sodium sulphate, whereby a dihydroxyanthraquinone sulphonic acid is produced, seeding the reaction mixture during the course of the sulphonation with crystals comprising said sulphonic acid to cause separation of said resulting sulphonic acid in the form of an alkali metal salt, and continuing said sulphonation in the presence of the resulting separated dihydroxyanthraquinone sulphonic acid.

15. A process for the production of anthraquinone derivatives which comprises heating an anthraquinone compound which is free from a primary amino group with a sulphonating mixture containing oleum and a sulphate of an alkali metal as a sulphonation modifier, whereby an anthraquinone sulphonic acid is produced, and, during the sulphonation, causing the sulphonic acid produced to separate out of solution in the form of an alkali-metal salt, by adding to the reaction mixture crystals comprising said sulphonic acid as a seed.

16. A process for the production of anthraquinone derivatives which comprises sulphonating alizarine by heating it with a reaction mixture containing oleum and a sulphate of an alkali-metal, and seeding the reaction mixture during the sulphonation to cause the sulphonic acid produced to separate out of solution in the reaction mixture.

17. A process for the production of alizarin sulphonic acid which comprises heating alizarin with a sulphonating solution of sodium sulphate in oleum of about 10 to about 20 per cent strength at a temperature between 80° and 130° C.

18. A process for the production of alizarin sulphonic acid which comprises heating alizarin with a sulphonating solution of sodium sulphate in oleum of about 16 to about 18 per cent strength at a temperature of about 90° to about 100° C.

19. A process for the production of anthraquinone derivatives which comprises heating anthraquinone with a sulphonating mixture containing oleum and sodium sulphate, whereby an anthraquinone sulphonic acid compound is produced, and, during the sulphonation, causing the sulphonic acid produced to separate out of solution in the form of a sodium salt, by adding to the reaction mixture crystals comprising said sulphonic acid as a seed.

20. A process for the production of anthraquinone disulphonic acid which comprises heating anthraquinone with a sulphonating solution of sodium sulphate in oleum of about 22 to 30 per cent strength at a temperature between 100° and 160° C. and in the presence of mercury sulphate.

21. A process for the production of anthraquinone disulphonic acid which comprises heating anthraquinone with a sulphonating solution of sodium sulphate in oleum of about 26 per cent strength at a temperature of about 120° to about 130° C. and in the presence of mercurous sulphate.

22. A process for the production of anthraquinone derivatives which comprises heating an anthraquinone compound, having the probable formula:

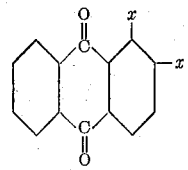

in which $x$ represents a hydrogen atom or a hydroxyl group, with a sulphonating mixture containing oleum and a sulphate of an alkali metal as a sulphonation modifier, whereby an anthraquinone sulphonic acid compound is produced, and adding the resulting reaction mixture to an aqueous solution of an alkali metal chloride.

23. A process for the production of anthraquinone derivatives which comprises sulphonating alizarine by heating it with a reaction mixture containing oleum and sodium sulphate, and adding the resulting reaction mixture to an aqueous solution of an alkali-metal chloride.

24. A process for the production of anthraquinone derivatives which comprises heating an anthraquinone compound, having the probable formula

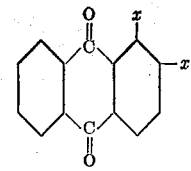

in which $x$ represents a hydrogen atom or a hydroxyl group, with a sulphonating mixture containing oleum and a sulphate of an alkali metal as a sulphonating modifier whereby an anthraquinone sulphonic acid compound is produced, during the sulphonating causing the sulphonic acid produced to separate out of solution by adding to the reaction mixture crystals comprising said sulphonic acid as a seed, and adding the resulting mixture, upon completion of the sulphonation, to an aqueous solution of an alkali-metal chloride.

25. A process for the production of anthraquinone derivatives which comprises heating anthraquinone with a mixture of oleum, mercury sulphate and sodium sulphate, whereby anthraquinone disulphonic acid is produced, during the sulphonation adding crystals of a sodium salt of anthraquinone disulphonic acid as a seed, to cause anthraquinone disulphonic acid to crystallize out of solution in the reaction mixture, adding the resulting reaction mixture, upon completion of the sulphonation, to an aqueous solution of sodium chloride, and filtering off the resulting sodium salt of anthraquinone disulphonic acid.

26. A process for the recovery of an anthraquinone sulphonic acid compound which comprises mixing an aqueous solution of an alkali-metal compound, capable of reacting with an anthraquinone sulphonic acid to form an alkali-metal salt thereof, with a reaction mixture resulting from the sulphonation of an anthraquinone compound with oleum, said reaction mixture containing an alkali-metal salt.

27. A process for the recovery of an anthraquinone sulphonic acid compound which comprises mixing an aqueous solution of an alkali-metal compound, capable of reacting with an anthraquinone sulphonic acid to form an alkali-metal salt thereof, with a reaction mixture resulting from the sulphonation of an anthraquinone compound by heating it with a sulphonating mixture containing oleum and a sulphate of an alkali-forming metal.

28. A process for the recovery of an anthraquinone sulphonic acid compound which comprises mixing an aqueous solution of an alkali-metal chloride with a reaction mixture resulting from the sulphonation by heating with oleum of an anthraquinone compound, having the probable formula

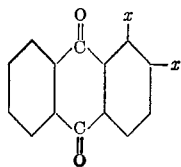

in which $x$ represents a hydrogen atom or a hydroxyl group, said reaction mixture containing an alkali-metal salt, and separating the resulting alkali-metal salt of the anthraquinone sulphonic acid compound.

29. A process for the recovery of an anthraquinone sulphonic acid compound which comprises mixing an aqueous solution of an alkali-metal chloride with a reaction mixture resulting from the sulphonation of an anthraquinone compound, having the probable formula

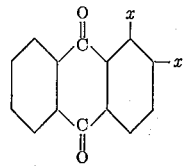

in which $x$ represents a hydrogen atom or a hydroxyl group, by heating it with a reaction mixture containing oleum and an alkali-metal sulphate.

30. A process for the recovery of an anthraquinone sulphonic acid compound which comprises mixing an aqueous solution of an alkali-metal chloride with a reaction mixture resulting from the sulphonation of alizarine with a sulphonating mixture containing oleum and sodium sulphate, and separating the resulting alkali-metal salt of alizarine sulphonic acid.

31. A process for the production of anthraquinone derivatives which comprises heating 1.4-di-paratolyl-amino-anthraquinone with a sulphonating solution of sodium sulphate in oleum at a temperature of about 40° to about 60° C.

DONALD G. ROGERS.

CERTIFICATE OF CORRECTION.

Patent No. 1,963,383.　　　　　　　　　　　　　　　　　　　　　　　　June 19, 1934.

DONALD G. ROGERS.

It is hereby certified that error appears in the printed specification of the above numbered patent requiring correction as follows: Page 2, line 98, for "anthaquinone" read anthraquinone; page 5, line 52, claim 2, for "reaction" read reacting; and lines 116-117, claim 8, strike out the words and comma "whereby an anthraquinone sulphonic acid compound is produced," and insert the same before "and" second occurrence in line 118, of same claim; page 6, line 75, claim 19, strike out the word "compound"; and lines 133 and 135, claim 24, for "sulphonating" read sulphonation; and that the said Letters Patent should be read with these corrections therein that the same may conform to the record of the case in the Patent Office.

Signed and sealed this 11th day of September, A. D. 1934.

(Seal)　　　　　　　　　　　　　　　　　　　　　　　　　　　　　　　　Leslie Frazer
　　　　　　　　　　　　　　　　　　　　　　　　　　　　　　　　Acting Commissioner of Patents.